3,192,245
PREPARATION OF DIARYLACETONITRILES AND THEIR RING SUBSTITUTED DERIVATIVES
George Kesslin, Teaneck, N.J., and Alvin C. Flisik and Robert Bradshaw, Stony Point, N.Y., assignors to Kay-Fries Chemicals, Inc., West Haverstraw, N.Y., a corporation of New York
No Drawing. Filed May 25, 1962, Ser. No. 197,570
14 Claims. (Cl. 260—465)

This invention relates to a novel method for the preparation of diarylacetonitriles and their ring-substituted derivatives. More particularly, the invention concerns the synthesis of diphenylacetonitriles and novel condensing agents therefor.

Diphenylacetonitrile, also known as α-cyanodiphenylmethane $(C_6H_5)_2CHCN$, forms white crystals, M.P. 73–73.5° C. This compound and its ring-substituted derivatives are used as herbicides, for the synthesis of other organic compounds, such as diphenylacetic acid and p-diphenylethylamine, and as an intermediate in the preparation of antispasmodic drugs.

Diphenylacetonitriles are conventionally prepared by the reaction of mandelonitrile (benzaldehyde cyanohydrin) or a ring-substituted derivative thereof, with an aromatic hydrocarbon, in the presence of a condensing agent, in accordance with the general equation:

$$R-CH(OH)SN + R'H \rightarrow RR'-CH-CN + H_2O \quad (1)$$

wherein both R and R' are aryl radicals or substituted aryl radicals.

The condensing agents which have heretofore been employed for this reaction have included anhydrous aluminum chloride, boron trifluoride and its etherates, stannic chloride, and phosphorus pentoxide. Each of these agents in varying degrees, possesses certain drawbacks. They are all difficult to handle industrially, and all are comparatively expensive. Thus, the yields produced with aluminum chloride and boron trifluoride, while reasonably good, are offset by the high molar costs of these substances, while the yields with stannic chloride and phosphorus pentoxide as condensing agents are too low (22.8%) to be of commercial interest.

In accordance with the present invention there is provided a novel method for the preparation of diarylacetonitriles, employing as a condensing agent a sulfuryl compound of the general formula $SO_2(OH)X$, wherein X is OH or halogen.

The sulfuryl compounds which are useful as condensing agents, in accordance with the invention, include sulfuryl dihydroxide or sulfuric acid $SO_2(OH)_2$, as well as the sulfuryl halohydrins, or halosulfonic acids, such as, for example, chlorosulfonic acid $SO_2(OH)Cl$, and fluosulfonic acid $SO_2(OH)F$. The sulfuryl compounds are advantageously employed at 100% strength.

It is also within the contemplation of the invention to use as condensing agents, mixtures of two or more of the aforementioned sulfuryl compounds, such as, for example, mixtures of 100% sulfuric acid and chlorsulfonic acid, or of 100% sulfuric acid and fluosulfonic acid.

When employed as condensing agents for reaction 1 above, the sulfuryl compounds improve the smoothness and the yields of the process. They possess the advantage of being liquids and hence are easier to handle than the solid agents of the prior art. Their cost per mol is much less than that of aluminum chloride or boron trifluoride, with attendant economies in operation. The product of the reaction is obtainable in good purity and in yields which may be as high as 80% of theory.

In general, the total amount of condensing agent employed will range from about 1 to about 5 mols per mol of starting aryl cyanohydrin, and preferably from about 2 to about 3 mols per mol.

As mentioned previously, the sulfuric acid is preferably employed at 100% strength. The reason is that the presence of water tends to lower the yield, this effect being multiplied by the water formed in the reaction. Fuming sulfuric acid is undesirable because it tends to cause sulfonation of the reactants.

It has been found, in accordance with the invention, that a mixture of 100% sulfuric acid and a halosulfonic acid provides a more effective condensing agent than does either sulfuryl compound taken alone. A possible explanation is that the halosulfonic acid takes up some or all of the water formed in the course of the reaction, preventing dilution of the sulfuric acid and reduction of its condensing agent potential, and also minimizing hydrolysis of the resulting diarylacetonitrile to a diarylacetic acid. Where a mixture of 100% sulfuric acid and a halosulfonic acid is employed as a condensing agent, the mixture will advantageously contain a major proportion of the sulfuric acid and a minor proportion of the halosulfonic acid, although this relationship may be varied within wide limits. The preferred molar ratio of sulfuric acid to halosulfonic acid lies betwen about 1:1 and 2:1.

Although in Equation 1 above it is indicated that molar proportions of the reactants are employed, it has been found that improved yields are obtained when several mols of the aromatic hydrocarbon or substituted aromatic hydrocarbon are used. The ratio may be of the order of 3 to 4 mols per mol of the aryl cyanohydrin reactant. The aromatic hydrocarbon or its derivative serves as the reaction medium, and in general no auxiliary solvent or diluent is required, although if necessary, a diluent which is inert to the reaction may be included.

The reactants and the condensing agent should all be in substantially anhydrous condition, and the reaction is carried out under substantially anhydrous conditions.

The reaction is advantageously performed at a temperature somewhat below ambient temperature, and preferably at a temperature between about 5° and 10° C. The aryl syanohydrin is dissolved in the aromatic hydrocarbon or substituted aromatic hydrocarbon and the solution added gradually to the condensing agent. Reaction time will vary according to the reactants employed and other factors, but will generaly take from 2 to 3 hours. The reaction mixture formed is quenched by adding it to cold water, and the oily layer which forms is separated. The quench water is extracted with an organic solvent such as benzene to recover additional reaction product, and the extracts are combined and washed with water to remove acid, and neutralized with dilute alkali. The product is recovered from the washed extracts by distillation at reduced pressure.

The reactants are, respectively, an aryl cyanohydrin or a ring-substituted derivative thereof, and an aromatic hydrocarbon, or its ring-substituted derivative.

The aryl cyanohydrin may be one in which the aryl radical is both unsubstituted or substituted. The aryl radical may include both phenyl and naphthyl radicals. Ring substituents may include one or more halogen atoms, alkyl groups or alkoxy groups. The method of the invention is especially adapted to monosubstituted aryl radicals, suitable substituents including chlorine, bromine, fluorine atoms, lower alkyl groups such as methyl, ethyl, propyl, and butyl groups, and lower alkoxy groups, such as methoxy and ethoxy groups. Examples of aryl cyanohydrins which may be employed as starting materials include mandelonitrile (benzaldehyde cyanohydrin), o-chlorbenzaldehyde cyanohydrin, p-methylbenzaldehyde cyanohydrin, o-methoxybenzaldehyde cyanohydrin, and the like.

The aromatic hydrocarbon reactant may be either unsubstituted or substituted, and is preferably a substance which is liquid at the reaction temperature and will function as a solvent medium, although as mentioned earlier, an auxiliary diluent may be employed. Generally the reactant is a monocyclic aromatic hydrocarbon or a ring-substituted derivative, including both mono- and polysubstitution compounds. Suitable reactants include benzene and halobenzenes, alkylbenzenes, and alkoxy-benzenes. The alkyl and alkoxy substituents include lower alkyl groups, such as methyl, ethyl, propyl and butyl groups, while the alkoxy groups include lower alkoxy groups such as methoxy and ethoxy groups. Examples of reactants of this type include benzene, toluene, the xylenes, chlorobenzene, and anisole.

The following examples serve to explain more fully the novel principles of the invention, but it is to be understood that these examples are illustrative and not limiting.

*Example 1.—Preparation of diphenylacetonitrile*

This example involves the reaction of 1 mol mandelonitrile, 5.1 mols 100% sulfuric acid and 4 mols of benzene. 500.0 g. of 100% $H_2SO_4$ were placed in a round bottom flask equipped with an agitator, thermometer and dropping funnel. Then 133.5 g. of mandelonitrile were dissolved in the benzene and the solution added gradually to the sulfuric acid during 3 hours at a reaction mixture temperature between 5° and 10° C. Agitation was continued an additional hour at this temperature following addition of all the mandelonitrile and benzene. The reaction mixture was then quenched by adding it to 1 liter of cold water. The oil layer which formed was separated. The quench water was extracted with 50 cc. benzene. The extracts were combined and washed with water to remove acid, and any remaining acidity was neutralized by washing with dilute (5%) sodium carbonate solution. The neutralized extracts were distilled, the benzene being taken off at 28 inches vacuum up to a liquid temperature of 100° C. The product was distilled in vacuo at 7 mm. pressure, most of it distilling between 155° and 180° C. There were obtained 123.4 g. diphenylacetonitrile, having a M.P. 71.3° C., corresponding to a yield of 63.5% based on mandelonitrile.

*Example 2.—Preparation of diphenylacetonitrile*

Following the procedure set forth in Example 1, the reactants were employed in molar proportions: 1 mol mandelonitrile, 1 mol 100% $H_2SO_4$, and 2.8 mols benzene. The quantities used were 218.0 g. benzene, 133.5 g. mandelonitrile and 98.0 g. 100% $H_2SO_4$. A yield of 51.5% based on mandelonitrile was obtained.

*Example 3.—Preparation of diphenylacetonitrile*

In accordance with the procedure of Example 1, the reactants were employed in the following molar and actual proportions: 1 mol (133.5 g.) mandelonitrile, 3 mols (294.5 g.) 100% $H_2SO_4$, and 2.56 mols (200.0 g.) benzene. The yield was 63.2% based on mandelonitrile.

*Example 4.—Preparation of diphenylacetonitrile*

Using the apparatus and general procedure of Example 1, the reactants were employed in molar proportions: 1 mol mandelonitrile, 2 mols chlorsulfonic acid, and 2 mols benzene. 133.2 g. of mandelonitrile were dissolved in 156.0 g. benzene and the solution was added to 233.06 g. chlorsulfonic acid at 15°–20° C. over a period of 1 hour. After all the reactants were mixed, the mixture was agitated for another hour at the same temperature, and quenched in cold water. The oil layer was separated and washed with water. The water layer was extracted with benzene, the washings added to the reaction mixture, and the solution washed with 5% sodium carbonate. The benzene was distilled off at 28 inches vacuum to a liquid temperature of 100° C. The residue was distilled at 7 mm. pressure, the product being taken from 155° to 180° C. There were obtained 89 g. of diphenylacetonitrile, 46% yield, M.P. 71–72° C.

*Example 5.—Preparation of diphenylacetonitrile*

This example illustrates the use of a 2:1 molar mixture of 100% sulfuric acid and chlorsulfonic acid as the condensing agent. The molar and actual proportions of the reactants were: 1 mol mandelonitrile (88 g.), 3.88 mols benzene (200 g.), 2 mols 100% $H_2SO_4$ (129.5 g.), and 1 mol chlorsulfonic acid (77.0 g.). The procedure employed was that of Example 4. There were obtained 156 g. of product M.P. 72° C., yield 80.65% based on mandelonitrile.

*Example 6.—Preparation of diphenylacetonitrile*

The apparatus was that described in Example 1, and the molar proportions of the reactants were: 1 mol mandelonitrile, 3 mols benzene, 2 mols 100% $H_2SO_4$, and 1 mol fluosulfonic acid, 32.25 g. mandelonitrile were dissolved in 58.5 g. benzene and the solution was added to 49.0 g. 100% $H_2SO_4$ simultaneously with 25.0 g. fluosulfonic acid. The period of addition was 2.5 hours while agitating at 5°–10° C., cooling with ice. After all reactants were added, the reaction mixture was agitated for another hour at the same temperature. The reaction mixture was quenched by adding it to 75 ml. water at 25°–30° C. After extracting the lower aqueous layer with 20 ml. benzene, the benzene layers were combined and washed with 117 ml. water, followed by a wash with 50 ml. water containing 2 ml. 15% $Na_2CO_3$ solution. The product layer was separated and the benzene removed by distillation at 28 inches vacuum to a liquid temperature of 100° C. The residue was distilled at 7 mm. pressure and 170°–175° C. There were obtained 33.9 g. diphenylacetonitrile M.P. 71.6–73.7° C., corresponding to a yield of 70.25% based on mandelonitrile.

*Example 7.—Preparation of tolyl-phenylacetonitrile*

The molar proportions of the reactants were: 1 mol mandelonitrile, 3 mols toluene, 2 mols 100% $H_2SO_4$, and 1 mol chlorsulfonic acid. Using the apparatus of Examples 1 and 4, 66.5 g. mandelonitrile were dissolved in 138.0 g. toluene, and added simultaneously with 58.3 g. chlorsulfonic acid to 98.0 g. 100% $H_2SO_4$, with agitation over a period of 1.5 hours, at 5°–10° C. Some HCl was elvolved and an ice water bath was used to hold the reaction temperature in the indicated range. Following the addition period the mixture was agitated at 1 hour at the same temperature and then quenched by adding to 150 ml. water at 30° C. The lower aqueous layer was separated and extracted with 40 ml. toluene. The toluene extract was combined with the reaction mixture and washed with 250 ml. water at 30° C. the product was washed with 15% $Na_2CO_3$ solution and then with water, and then distilled at 27.5 inches vacuum to a liquid temperature of 145° C. to remove unreacted toluene, and the residue distilled at 4 mm. pressure, collecting a fraction from 135°–172° C. There were obtained 68.4 g. of crude product, corresponding to a yield of 66% based on mandelonitrile, which was purified by recrystallization from ethanol, M.P. 60.1–60.9° C.

*Example 8.—Preparation of phenyl-p-methoxyphenyl-acetonitrile*

The molar proportions of the reactants were: 1 mol. mandelonitrile, 3 mols. anisole, 2 mols. 100% $H_2SO_4$, 1 mol. chlorsulfonic acid. Using the apparatus of Example 1, 66.5 g. mandelonitrile were dissolved in 162.2 g. anisole and the solution was added simultaneously with 58.23 g. chlorsulfonic acid to 98.0 g. 100% $H_2SO_4$ over a period of 2 hours at 5°–10° C. using an ice bath to maintain temperature. The very viscous reaction mixture was agitated an additional hour at the same temperature and then quenched by adding it to 150 ml. water at 30° C. The lower aqueous layer was separated and extracted wtih 40 ml. anisole and this extract added to the reaction mixture and warmed to 60° C. and washed with 270 ml. warm water. The water layer was separated and 100 cc. water added to the product layer, and remaining acidity neutralized with 15% $Na_2CO_3$ solution. The aqueous layer was separated and any emulsion present broken by addition of benzene and heating, with separation of any water formed. The product layer was distilled at 29 inches vacuum to remove benzene and anisole, heating to a liquid temperature of 155° C. The residue amounted to 48.2 g., representing a yield of 43.3% based on mandelonitrile. Upon recrystallization from ethanol the M.P. was 129.6–130.0° C.

*Example 9.—Preparation of phenyl-p-chlorphenyl-acetonitrile*

The molar proportions of the reactants were: 1 mol. mandelonitrile, 3 mols. chlorbenzene, 2 mols. 100% $H_2SO_4$, 1 mol. chlorsulfonic acid. Using the apparatus of Example 1, 66.5 g. mandelonitrile were dissolved in 168.75 g. chlorbenzene and the solution was added simultaneously with 58.23 g. chlorsulfonic acid to 98.0 g. 100% $H_2SO_4$ at 5–10° C. during 1.5 hours using an ice cooling bath. After addition was complete the reaction mixture was agitated for 1 hour at 5–10° C. and then quenched by adding it to 150 ml. water at 30° C. using an ice cooling bath. The aqueous layer was separated and extracted with 40 ml. chlorbenzene. The extract was added to the product layer and washed with 234 ml. warm water. The water layer was separated and an additional 100 ml. water was added and remaining acidity neutralized with 15% $Na_2CO_3$ solution. The aqueous layer was separated and the product layer given a final 100 ml. water wash. The product layer was separated and fractionally distilled under 29 inches vacuum to a liquid temperature of 150° C. to remove chlorbenzene. The residue was distilled at 6 mm. pressure to obtain a product fraction between 193° and 200° C. There were obtained 87.9 g. crude phenyl-p-chlorphenyl-acetonitrile, corresponding to a yield of 77.25% based on mandelonitrile, M.P. 59.5–73.0° C. On recrystallization from ethanol the product melted at 76.5–77.0° C.

*Example 10.—Preparation of phenyl-o-chlorphenyl-acetonitrile*

The molar proportions of the reactants were: 1 mol. o-chlorbenzaldehyde cyanohydrin, 3 mols. benzene, 2 mols. 100% $H_2SO_4$, and 1 mol. chlorsulfonic acid. Using the apparatus of Example 1, 83.55 g. o-chlorbenzaldehyde cyanohydrin were dissolved in 117 g. benzene and added simultaneously with 58.23 g. chlorsulfonic acid to 98.0 g. 100% $H_2SO_4$ over a period of 1 hour at 5–10° C., using an ice water bath. The dark viscous reaction mixture was then agitated for an additional hour at this temperature. The reaction mixture was quenched by adding slowly to 150 ml. water at about 30° C., the aqueous layer was separated and extracted with 40 ml. benzene and the benzene extract combined with the product layer. The combined benzene solution was washed with 260 ml. water at about 35° C., the water layer was separated and the benzene solution washed with 100 ml. water, and remaining acidity was neutralized with 15% $Na_2CO_3$ solution. The aqueous layer was separated and the product layer finally washed with 100 ml. water. The aqueous layer was separated and the product layer distilled under 29 inches vacuum to a liquid temperature of 100° C. to remove benzene. The residue was distilled at 3 mm. pressure, collecting a main fraction at 158–162° C. There were obtained 60 g. corresponding to a yield of 52.75% based on o-chlorbenzaldehyde cyanohydrin. On recrystallization from ethanol, the product had a M.P. 40.0–41.1° C.

The compound of this example is considered to be novel. It, also, can be used for the purposes mentioned above.

Pressures are expressed herein in terms of millimeters of mercury.

It will be apparent the foregoing examples are illustrative and that those skilled in this art may make many changes in the details thereof without departing from the spirit of the invention or the scope thereof as defined in the appended claims.

What is claimed is:

1. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of a condensing agent consisting essentially of at least one sulfuryl compound of the formula $SO_2(OH)X$, wherein X is a halogen, at a temperature between about 5 and 20° C.

2. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of from about 1 to 5 mols per mol of cyanohydrin of a condensing agent consisting essentially of at least one sulfuryl compound of the formula $SO_2(OH)X$, wherein X is a halogen at a temperature between about 5 and 20° C.

3. Method for the prepartion of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with from about 3 to about 4 mols of an aromatic compound selected from the group consisting of benzene and benzene at most twice substituted by a halogen, a lower alkyl and a lower alkoxy substituent in the presence of from about 1 to about 5 mols, per mol of cyanohydrin, of a condensing agent consisting essentially of at least one sulfuryl compound of the formula $SO_2(OH)X$, wherein X is a halogen, at a temperature between about 5 and 20° C.

4. Method for the prepartion of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of chlorsulfonic acid as a condensing agent.

5. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of fluosulfonic acid as a condensing agent.

6. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of a condensing agent comprising both 100% sulfuric acid and chlorsulfonic acid, at a temperature between about 5 and 20° C.

7. Method for the prepartion of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of a condensing agent comprising 100% sulfuric acid and chlorsulfonic acid in a molar ratio of about 2:1, at a temperature between about 5 and 20° C.

8. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of a condensing agent consisting essentially of at least one sulfuryl compound of the formula $SO_2(OH)X$, wherein X is a halogen, at a temperature between about 5° and 10° C.

9. Method for the preparation of diphenylacetonitrile which comprises reacting mandelonitrile with benzene in the presence of a condensing agent consisting essentially of at least one sulfuryl compound of the formula $SO_2(OH)X$, wherein X is a halogen, at a temperature between about 5 and 20° C.

10. Method for the prepartion of diphenylacetonitrile which comprises reacting mandelonitrile with benzene in the presence of chlorsulfonic acid as a condensing agent, at a temperature between about 5 and 20° C.

11. Method for the preparation of diphenylacetonitrile which comprises reacting mandelonitrile with benzene in the presence of a condensing agent comprising both 100% sulfuric acid and chlorsulfonic acid, at a temperature between about 5 and 20° C.

12. Method for the preparation of diphenylacetonitrile which comprises reacting 1 mol of mandelonitrile with between 3 and 4 mols of benzene, in the presence of a condensing agent consisting of 2 mols of 100% sulfuric acid and 1 mol of chlorsulfonic acid, at a temperature between about 5 and 20° C.

13. Method for the preparation of a diarylacetonitrile which comprises reacting an aryl cyanohydrin selected from the group consisting of phenyl and naphthyl cyanohydrins and said cyanohydrins monosubstituted by a halogen, a lower alkyl and a lower alkoxy substituent with an aromatic compound selected from the group consisting of benzene and benzene at most twice substituted by a halogen, a lower alkyl and a lower alkoxy substituent in the presence of a condensing agent consisting essentially of both 100% sulfuric acid and fluosulfonic acid.

14. A method for the preparation of a diarylacetonitrile which comprises reacting an aryl cyanohydrin selected from the group consisting of phenyl and naphthyl cyanohydrins and said cyanohydrins mono-substituted by a halogen, a lower alkyl and a lower alkoxy substituent with an aromatic compound selected from the group consisting of benzene and benzene at most twice substituted by a halogen, a lower alkyl, and a lower alkoxy substituent in the presence of a condensing agent consisting essentially of sulfuric acid and a halosulfonic acid.

References Cited by the Examiner

UNITED STATES PATENTS 2,443,246   6/48   Homeyer et al. _____ 260—465

OTHER REFERENCES

Sisido et al., Journal of Organic Chemistry, 1954, vol. 19, No. 10, pp. 1699–1703.

CHARLES B. PARKER, *Primary Examiner.*

LEON ZITVER, *Examiner.*